United States Patent [19]
Clayton

[11] 3,963,129
[45] June 15, 1976

[54] MOTORCYCLE CARRIER

[76] Inventor: Jack E. Clayton, 2439 E. Oak St., Stockton, Calif. 95205

[22] Filed: Jan. 20, 1975

[21] Appl. No.: 542,579

[52] U.S. Cl............................ 214/86 A; 214/450; 214/130 R
[51] Int. Cl.² .................... B60P 3/12; B60R 9/00
[58] Field of Search................. 214/86 A, 450, 501, 214/505, 85, 85.1, 130 R; 254/139.1; 280/402, 474, 432, 150 F, 292, 204, 446 B

[56] References Cited
UNITED STATES PATENTS

| | | | |
|---|---|---|---|
| 1,573,320 | 2/1926 | Kline | 280/474 |
| 3,182,829 | 5/1965 | Wagner | 214/86 A |
| 3,428,332 | 2/1969 | McCance | 280/402 |
| 3,458,073 | 7/1969 | Dawson | 214/450 |
| 3,502,351 | 3/1970 | Gray | 280/474 X |
| 3,690,482 | 9/1972 | Gaumont | 214/86 A |
| 3,695,469 | 10/1972 | Arant | 214/450 |
| 3,892,321 | 7/1975 | Westbrook, Jr. | 214/86 A |

*Primary Examiner*—Albert J. Makay
*Attorney, Agent, or Firm*—Roger B. Webster

[57] ABSTRACT

A motorcycle carrier adapted for use with a conventional tow truck which includes a longitudinal, truck body-mounted, rearwardly and upwardly projecting crane having a depending, power-winch actuated lift cable; the motorcycle carrier comprising—in initially knocked-down but readily assembled form—a longitudinal, rearwardly extending, motorcycle-receiving boom unit coupled at the front end to the rear of the truck for selective positioning, in laterally stabilized relation, between a lowered position inclining downwardly and rearwardly into ground engagement for loading of a motorcycle onto the boom unit, and a raised aboveground, substantially horizontal position for transport of the motorcycle on said boom unit, and transversely spaced suspension straps secured to the rear end of the boom unit, thence extending upwardly in straddling and lateral tilt-preventing relation to the supported motorcycle, and connected at their upper ends to the lift cable whereby the latter serves to vertically adjust and positionally suspend the boom unit.

4 Claims, 5 Drawing Figures

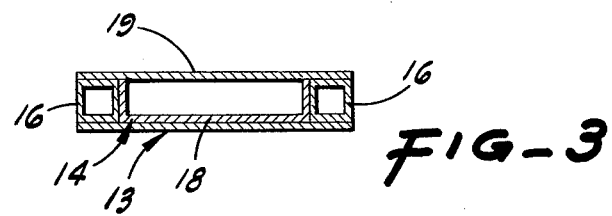
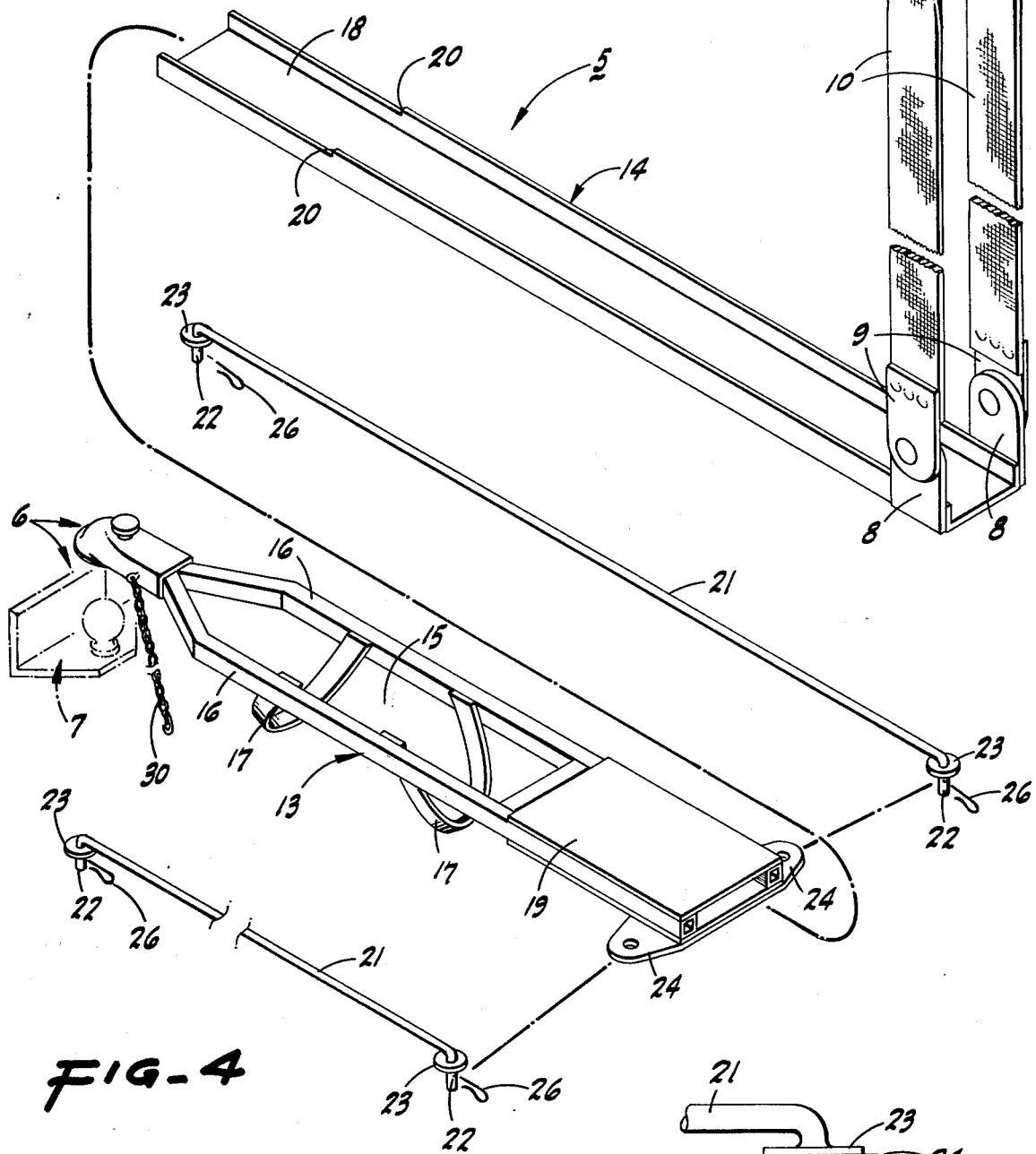
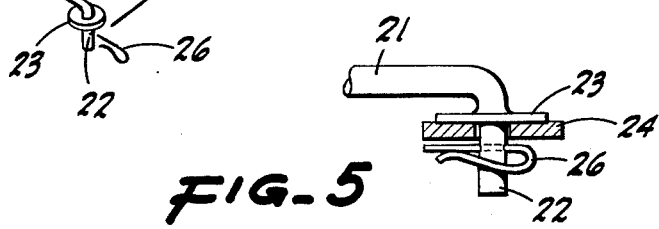

MOTORCYCLE CARRIER

BACKGROUND OF THE INVENTION

With the advent of extensive use of motorcycles, and the resultant higher incidence of motorcycle accidents, operators of conventional vehicle tow trucks have experienced difficulty in lifting and transporting wrecked motorcycles. The present invention was conceived in a successful effort to solve such problem.

SUMMARY OF THE INVENTION

The present invention provides, as an important object, a motorcycle carrier adapted for use with a conventional tow truck; the carrier—initially knocked-down for compact storage in the truck—being readily manually assembled and connected, for use, with the truck at the rear; the carrier being arranged for ease of placement and effective retention of a motorcycle thereon.

The present invention provides, as another important object, a motorcycle carrier, as above, adapted for use with a tow truck which includes a longitudinal, truck body-mounted, rearwardly and upwardly projecting crane having a depending, power-winch actuated lift cable; the motorcycle carrier comprising a longitudinal, rearwardly extending, motorcycle-receiving boom unit coupled at the front end to the rear of the truck for selective positioning, in laterally stabilized relation, between a lowered position inclining downwardly and rearwardly into ground engagement for loading of a motorcycle onto the boom unit, and a raised above-ground, substantially horizontal position for transport of the motorcycle on said boom unit, and transversely spaced suspension straps secured to the rear end of the boom unit, thence extending upwardly in straddling and lateral tilt-preventing relation to the supported motorcycle, and connected at their upper ends to the lift cable whereby the latter serves to vertically adjust and positionally suspend the boom unit.

The present invention provides, as a further object, a motorcycle carrier which is designed for ease and economy of manufacture.

The present invention provides, as a still further object, a practical, reliable, and durable motorcycle carrier, and one which is exceedingly effective for the purpose for which it is designed.

BRIEF DESCRIPTION OF THE DRAWINGS

FIG. 3 is an enlarged cross section on line 3—3 of FIG. 1.

FIG. 4 is an exploded view showing the parts of the carrier in enlargement and disengaged.

FIG. 5 is an enlarged cross section on line 5—5 of FIG. 2.

DESCRIPTION OF THE PREFERRED EMBODIMENT

Figure 1:
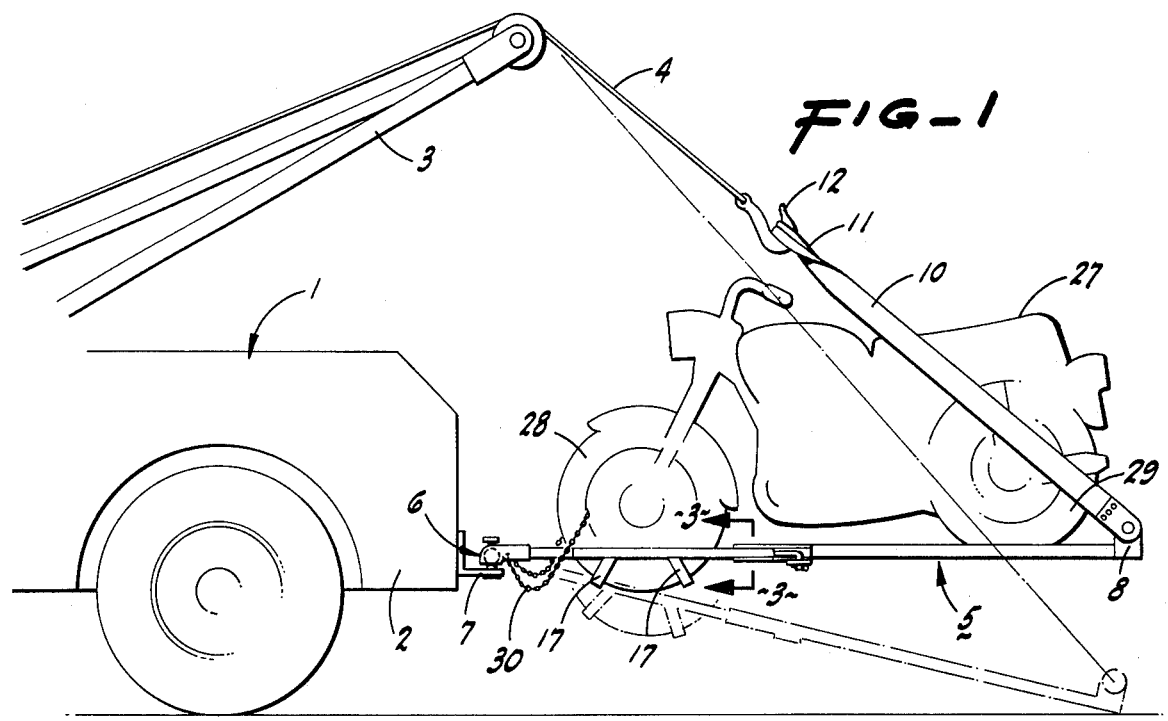
FIG. 1 is a side elevation showing, in full lines, the carrier as in use transporting a motorcycle; the near stay bar being partially broken away. In broken lines, the view shows the carrier lowered into ground engagement preparatory to loading of a motorcycle.
Figure 2:
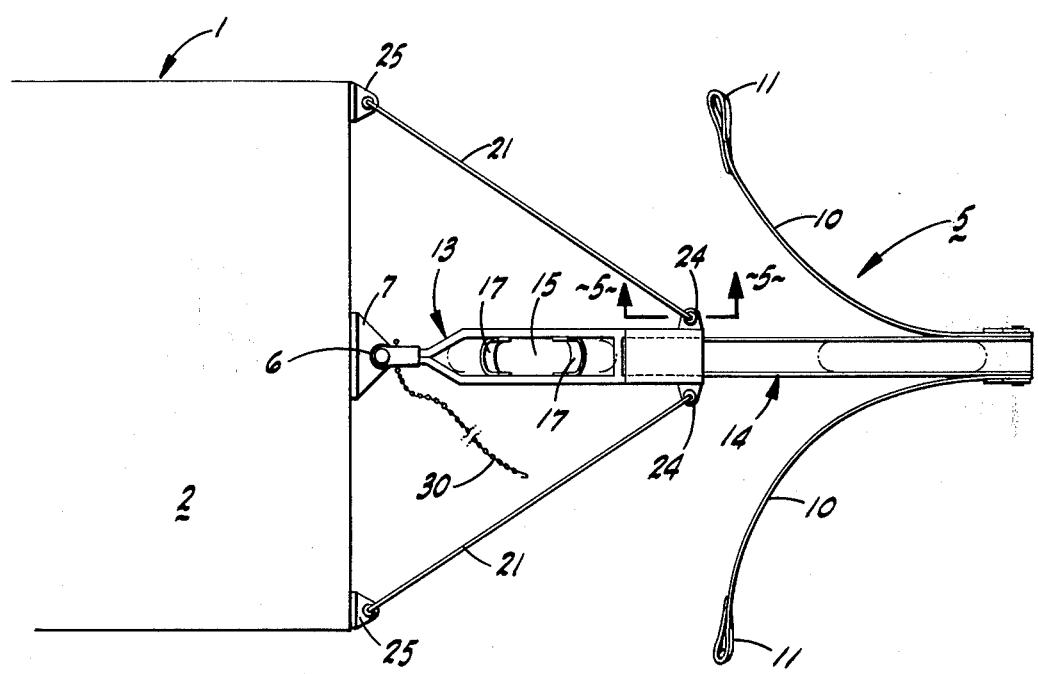
FIG. 2 is a plan view of the carrier as assembled for use, but before loading of a motorcycle.

Referring now more particularly to the drawings and to the characters of reference marked thereon, the motorcycle carrier of the present invention is adapted for use with a conventional tow truck, indicated generally at 1, which includes a body 2 and a longitudinal, body-mounted, rearwardly and upwardly projecting crane 3 having a reversibly power-actuated lift cable 4 adapted to depend rearwardly of the truck.

The carrier comprises a longitudinal, motorcycle-supporting boom unit, indicated generally at 5, projecting rearwardly from the truck centrally of its sides. The forward end of the boom unit 5 is detachably connected to the rear of the truck by means of a ball and socket coupling 6; the ball of which is carried on a truck-mounted bracket 7. The ball and socket coupling 6 permits the boom unit 5 to be lowered from a substantially horizontal transport position to a rearwardly and downwardly inclined ground-engaging position for loading.

At its rear end, the boom unit 5 includes fixed, transversely spaced, upstanding ears 8 to which plates 9 are pivotally connected; the plates 9 being fixed on the lower end of suspension straps 10 adapted to upstand in laterally spaced relation when the carrier is in use. At their upper ends, the suspension straps 10 are formed with loops 11 for engagement with a hook 12 on the lower or free end of the lift cable 4. The suspension straps 10—which are flexible—are preferably of a heavy-duty woven material such as nylon.

The boom unit 5 consists of a longitudinal front section (indicated generally at 13) and an alined longitudinal rear section (indicated generally at 14) detachably connected at adjacent ends in the manner later described.

The front section 13 is formed with a wheel-receiving well 15 defined by longitudinal, transversely spaced side bars 16 and longitudinally spaced cradles 17 which depend from and span between such side bars.

The rear section 14 is of upwardly opening channel form for wheel reception as will hereinafter appear; the front end portion of said rear section 14 providing a tongue 18 which detachably matchingly engages in a flat, rectangular, rearwardly opening socket 19 formed on the rear end of the front section 13. Stop shoulders 20 limit the extent of projection of the tongue 18 into the socket 19.

In order to maintain the rear section 14 in connection with the front section 13 when the carrier is in use, and to also prevent undesirable lateral swaying of the boom unit 5, the following arrangement is provided:

Elongated stay bars 21 extend from opposite sides of the boom unit 5, in forwardly diverging relation, to connection with the truck at the rear. The stay bars 21 each include—at the ends—downturned fingers 22 each topped by a fixed stop collar 23. The related fingers 22 depend through pad eyes 24 on opposite sides of the socket 19 and pad eyes 25 on the truck in widely but evenly spaced relation to opposite sides of the ball and socket coupling 6. Below the corresponding pad eye, each downturned finger 22 (which has a bore therethrough) receives a snap-type but detachable securing pin 26.

As the boom unit 5 and stay bars 21 are detachable from the truck, and as said boom unit embodies separable sections 13 and 14, the carrier is normally transported in knocked-down form in the body 2 of the truck 1. However, for use, the carrier can be readily and conveniently manually assembled by the simple expedients of engaging the ball and socket coupling 6, inserting tongue 18 in socket 19 to connect the front section 13 and rear section 14 at adjacent ends, and then applying the stay bars 21 between the pad eyes 24 and 25.

In the initial postion of the assembled carrier, the boom unit 5 inclines rearwardly and downwardly into ground engagement with the straps 10 laid aside, whereupon the motorcycle 27 is manually run forwardly onto said boom unit until the front wheel 28 of said motorcycle falls into and is received by the well 15; the rear wheel 29 then resting in the channel-form rear section 14. Nextly, the suspension straps 10 (previously laid aside) are swung to an erect position, and which is made possible by the pivoted connection plates 9; such straps then straddling the motorcycle, and thereabove the loops 11 are both engaged with the hook 12 of the lift cable 4. With the suspension straps 10 thus straddling the motorcycle, it is held against undesirable lateral tilting.

After the motorcycle 27 is loaded onto the boom unit 5, and the straps 10 connected to the hook 12 of lift cable 4, the latter is power-actuated to swing said boom unit 5 upwardly to a substantially horizontal position and in which the tow truck 1 then transports the motorcycle.

To further assure of retention of the motorcycle on the carrier, a safety chain 30 is passed through the front wheel 28 of the loaded motorcycle, with the chain ends attached to the coupling 6.

With a motorcycle carrier constructed as described, a motorcycle can be readily and conveniently loaded and then transported by a conventional tow truck, yet—when not in use and knocked-down—the carrier is placed in an out-of-the-way position in the body 2 of the truck.

From the foregoing description, it will be readily seen that there has been produced such a motorcycle carrier as substantially fulfills the objects of the invention, as set forth herein.

While this specification sets forth in detail the present and preferred construction of the motorcycle carrier, still in practice such deviations from such detail may be resorted to as do not form a departure from the spirit of the invention as defined by the appended claims.

I claim:

1. A motorcycle carrier for use with a tow truck including a crane having a lift cable adapted to depend rearwardly of the truck; the carrier comprising a longitudinal boom unit projecting rearwardly from the truck, means coupling the boom unit at its front end to the truck, the boom unit being of a structural configuration to support a motorcycle thereon, and means suspending the boom unit from the lift cable; the suspension means comprising a pair of straps secured at their lower ends to the rear portion of the boom unit and thence extending upwardly therefrom for connection with the lift cable above a motorcycle supported on the boom unit; said pair of straps straddling the supported motorcycle and stabilizing the same against lateral tilting.

2. A motorcycle carrier for use with a tow truck including a crane having a lift cable adapted to depend rearwardly of the truck; the carrier comprising a longitudinal boom unit projecting rearwardly from the truck, means coupling the boom unit at its front end to the truck, the boom unit being of a structural configuration to support a motorcycle thereon, and means suspending the boom unit from the lift cable; said coupling means being a separable connection unit; the boom unit including a longitudinal front section having a well for reception of the front wheel of a supported motorcycle, and a longitudinal rear section of upwardly opening channel form for reception of a supported motorcycle, and means detachably connecting said sections at adjacent ends; and the suspension means comprising transversely spaced straps secured to the rear section and extending upwardly, on opposite sides of a supported motorcycle, to detachable upper-end connection with the lift cable.

3. A motorcycle carrier, as in claim 2, including stay bars detachably connected, in forwardly diverging relation, between opposite sides of the boom unit and the truck.

4. A motorcycle carrier for use with a tow truck including a crane having a lift cable adapted to depend rearwardly of the truck; the carrier comprising a longitudinal boom unit projecting rearwardly from the truck counter to but lengthwise of the direction of forward travel therof, means coupling the boom unit at its front end to the truck, the boom unit including motorcycle wheel reception means, said boom unit being adapted to support a motorcycle thereon in an upright position and in relation to said means for wheel reception thereby, and means, suspending the boom unit from the lift cable, comprising suspension elements connected to laterally opposite sides of the boom unit and extending upwardly from the boom unit to the lift cable; said suspension elements being disposed on opposite sides of, and in laterally stabilizing engagement with, an upright motorcycle supported on the boom unit.

* * * * *